(12) United States Patent
McLeod

(10) Patent No.: US 11,662,174 B1
(45) Date of Patent: May 30, 2023

(54) EXPENDED TRAVEL LOWER RECEIVER

(71) Applicant: Cory McLeod, Joplin, MO (US)

(72) Inventor: Cory McLeod, Joplin, MO (US)

( * ) Notice: Subject to any disclaimer, the term of this patent is extended or adjusted under 35 U.S.C. 154(b) by 0 days.

(21) Appl. No.: 17/724,939

(22) Filed: Apr. 20, 2022

(51) Int. Cl.
*F41C 23/06* (2006.01)
*F41A 3/78* (2006.01)
*B33Y 80/00* (2015.01)

(52) U.S. Cl.
CPC ............... *F41C 23/06* (2013.01); *F41A 3/78* (2013.01); *B33Y 80/00* (2014.12)

(58) Field of Classification Search
CPC .................................. F41A 3/78; F41A 23/06
See application file for complete search history.

(56) References Cited

U.S. PATENT DOCUMENTS

| | | |
|---|---|---|
| 3,054,206 A | 9/1962 | Raleigh |
| 4,169,329 A * | 10/1979 | Atchisson ............... F41A 11/02 42/16 |
| 7,823,313 B2 | 11/2010 | Faifer |
| 8,555,541 B2 | 10/2013 | Ingram |
| 9,739,566 B2 | 8/2017 | Huang |
| 9,921,013 B1 | 3/2018 | Oglesby |
| 9,995,553 B1 | 6/2018 | Oglesby |
| 10,175,013 B1 * | 1/2019 | Shoffner ................... F41A 3/66 |
| 10,386,139 B1 * | 8/2019 | Sharps .................... F41A 17/38 |
| 10,690,428 B1 * | 6/2020 | Vestbom ................... F41A 17/04 |
| 10,852,083 B2 | 12/2020 | Underwood et al. |
| 2004/0020092 A1 * | 2/2004 | Christensen ............. F41A 9/61 42/49.01 |
| 2010/0236394 A1 * | 9/2010 | Gomez ................... F41A 19/46 89/138 |
| 2010/0251588 A1 * | 10/2010 | Kincel ..................... F41A 25/12 42/1.06 |
| 2010/0251591 A1 * | 10/2010 | Burt ........................ F41A 17/42 42/70.01 |
| 2014/0331535 A1 * | 11/2014 | Robinson .................. F41A 3/66 42/6 |
| 2015/0345881 A1 * | 12/2015 | Irvin ........................ F41A 3/78 42/1.06 |
| 2017/0227312 A1 * | 8/2017 | Christensen .............. F41A 9/66 |
| 2019/0041146 A1 * | 2/2019 | Johnson, Jr. .............. F41A 3/66 |
| 2019/0086168 A1 * | 3/2019 | Song ........................ F41A 3/84 |
| 2020/0025486 A1 * | 1/2020 | Zung ...................... F41A 17/46 |
| 2020/0064090 A1 * | 2/2020 | Russell .................... F41A 9/70 |
| 2020/0182568 A1 * | 6/2020 | Bergman .................. F41A 3/84 |
| 2020/0208930 A1 * | 7/2020 | Redillo ..................... F41A 3/72 |
| 2020/0386496 A1 | 12/2020 | Voegele et al. |
| 2021/0025665 A1 * | 1/2021 | Kincel ...................... F41A 3/84 |
| 2021/0140729 A1 * | 5/2021 | McMillan ................. F41A 3/66 |
| 2021/0270551 A1 * | 9/2021 | Underwood ............ F41A 17/36 |

* cited by examiner

*Primary Examiner* — Joshua E Freeman
(74) *Attorney, Agent, or Firm* — Ray Quinney & Nebeker P.C.; Thomas L. Lingard

(57) ABSTRACT

A buffer tower for a rifle includes a cut-out on an upper end thereof. The cut-out extends a travel length of the bolt during bolt action. The cut-out extends the travel length by greater than 10 mm. This extended travel length reduces the felt recoil of the rifle and increases the cycle time. An increased cycle time improves feeding reliability from the magazine.

20 Claims, 7 Drawing Sheets

EXPENDED TRAVEL LOWER RECEIVER

CROSS-REFERENCE TO RELATED APPLICATIONS

N/A.

BACKGROUND

Firearms are used for many purposes, including self-defense and recreation. There are many different types of firearms, including handguns and rifles. A rifle typically is a larger gun, requiring two hands to operate, and including a series of grooves used to rotate the bullet, stabilizing the bullet during flight. Many rifles are automatic, using the expanding gas from igniting the charge of the round to cycle a bolt, ejecting the casing from the spent round on the rearward path of the bolt, stripping a new round from the magazine on the forward path of the bolt, and discharging the new round. Some rifles are semi-automatic, requiring a positive trigger pull to discharge a second round.

BRIEF SUMMARY

In some embodiments, a rifle includes a lower receiver. A barrel is connected to the lower receiver and includes a longitudinal axis. A bolt is configured to strip rounds from a magazine and feed rounds into the chamber of the rifle. The bolt travels parallel to the longitudinal axis of the barrel. A buffer tower is a component of the lower receiver and includes a cut-out on an upper end thereof. The cut-out extends a travel length of the bolt during actuation of the bolt.

In some embodiments, a method for discharging a firearm includes igniting a charge of a round with a firing pin. Using a portion of expanding gas from ignition of the charge, a bolt carrier group is directed toward a rear end of the firearm. A portion of the bolt carrier group is passed past a front surface of a buffer tower of the firearm and into a cut-out of the buffer tower.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which:

FIG. 1-2 is a cross-sectional view of the rifle of FIG. 1-1;

FIG. 2-1 and 2-2 are top-down views of a rifle with the bolt carrier group in a forward and rearward position, according to at least one embodiment of the present disclosure; bolt carrier group.

FIG. 3-1 is a perspective view of a lower receiver, according to at least one embodiment of the present disclosure;

FIG. 3-2 is a cross-sectional view of the lower receiver of FIG. 3-1.

DETAILED DESCRIPTION

This disclosure generally relates to devices, systems, and methods for extending the travel of a bolt on a rifle. A lower receiver for the rifle includes a buffer tower. The buffer tower is internally threaded to receive a buffer tube. During bolt action while discharging a rifle round, a bolt extends backwards to the buffer tower. The buffer tower includes a cut-out that receives the bolt. The cut-out in the buffer tower extends the travel of the bolt along the length of the rifle as the bolt cycles backward toward the stock to eject the shell of the spent round. A length of the buffer tower is extended to provide force to support contact of the extending bolt with the buffer tower.

Extending the length of travel of the bolt (e.g., "bolt travel") may provide one or more benefits to the operation of the rifle. For instance, extending the bolt travel may increase the amount of travel time experienced by the bolt. This may increase the amount of time available for a magazine to move a new round into the position for the return travel of the bolt to strip it from the magazine. This may increase the reliability of stripping and feeding rounds during bolt action of the rifle.

In accordance with one or more embodiments of the present disclosure, extending the bolt travel may further provide additional time for the bolt catch to move upwards after the last round has been discharged. Allowing additional time for the bolt catch to move upwards may increase the reliability of the last round bolt hold-open functionality, thereby allowing a user to reliably and safely determine whether the last round has been extended and aid in subsequent reloading.

In some embodiments, extending the bolt travel may reduce the "kick" or recoil of the rifle, or the rearward force of the rifle caused by the discharge of the rifle round. For example, extending the bolt travel provides an increased distance for the bolt and buffer to travel backwards. This increased distance may allow the bolt and buffer additional time and distance to slow. This may reduce the amount of recoil felt by the user, thereby improving user experience. In some embodiments, extending the bolt travel may provide increased functionality using suppressors by further absorbing the momentum of the bolt and buffer.

Figure 1:
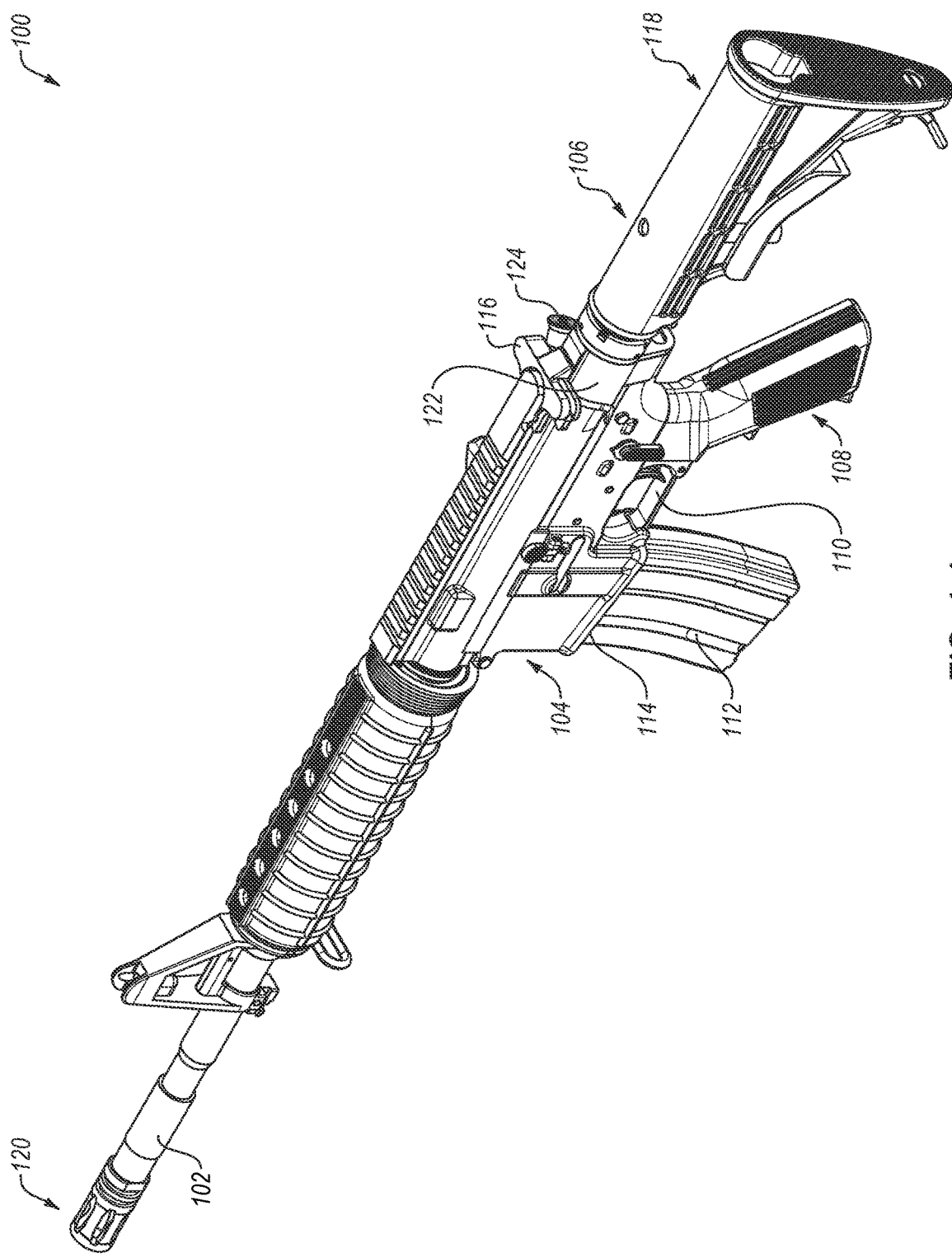
FIG. 1-1 is a perspective view of a rifle, according to at least one embodiment of the present disclosure.

FIG. 1-1 is a perspective view of a representation of a rifle 100, according to at least one embodiment of the present disclosure. The rifle 100 includes a barrel 102, a lower receiver 104, and a stock 106. A pistol grip 108 is connected to the lower receiver 104. A trigger 110 is located within reach of the pistol grip 108 to allow a user to grip the pistol grip 108 and pull the trigger 110 to discharge a round.

While the rifle 100 shown is an illustration of an ArmaLite rifle (AR), it should be understood that embodiments of the present disclosure may be applicable to any other rifle base. For example, the principles of the present disclosure may be applicable to any type of rifle, including AR-10, AR-15, M-16, LR-308, any other type of rifle, custom rifles, and combinations thereof including both direct impingement and piston driven uppers. In some embodiments, the rifle 100 may include automatic rifles and semi-automatic rifles.

A magazine 112 holds several rounds of ammunition. The magazine 112 is inserted into a magazine well 114 of the lower receiver 104. To load a round into the chamber of the rifle 100, the user may pull on a charging handle 116 toward a rear end 118 of the rifle 100. The charging handle 116 may be connected to a bolt carrier group. When the bolt carrier group clears an uppermost round in the magazine 112, a magazine spring in the magazine may push the uppermost round upwards into a chamber of the rifle 100. As the bolt moves toward a front end 120 of the rifle 100, the bolt may strip the round from the magazine and position the round for discharge.

The round may be discharged by the user pulling on the trigger 110. The trigger may cause a firing pin to contact and ignite a charge in the round. Expanding gas from the charge ignition may propel the round through and out of the barrel 102. Some of the gas may be redirected to the bolt to push the bolt toward the rear end 118 of the rifle 100. This may cause the bolt to clear the magazine 112, thereby allowing the magazine to push another round up into the chamber. A spring in the buffer may push the bolt back toward the front end 120 of the rifle 100. As the bolt travels back toward the front end 120, the bolt may strip another round from the magazine 112 and position it in the chamber for discharge. This re-loading of rounds in the chamber may be considered automatic or semi-automatic operation of the rifle 100. An automatic rifle may automatically load and fire subsequent rounds based on the firing action of the round. A semi-automatic rifle may automatically load rounds into the chamber but require a positive action by the user to fire the round, such as pulling of the trigger 110.

The lower receiver 104 includes a buffer tower 122. As the bolt travels toward the rear end 118 of the rifle 100, a buffer, located in a buffer tube 132, engages a rear of the buffer tube 132. This engagement with the rear of the buffer tube 132 causes rear movement of the buffer to stop. In some embodiments, the rearward movement of the bolt is stopped by the contact of the buffer with the rear end of the buffer tube. In some embodiments, the rearward movement of the bolt is stopped before any portion of the bolt contacts the buffer tower. In some embodiments, at least a portion of the bolt may contact the buffer tower. In some embodiments, the buffer spring in the buffer may push the bolt back toward the front end 120 of the rifle 100. In some embodiments, resistance from the buffer spring may stop motion of the bolt before the buffer engages the rear end of the buffer tube 132.

In accordance with at least one embodiment of the present disclosure, the buffer tower 122 may include a cut-out 124 at an upper portion of the lower receiver 104. The cut-out may extend the rearward travel of the bolt. As discussed herein, this may help to increase the length of travel of the bolt, thereby reducing the recoil of the rifle and increasing the amount of time for the bolt to cycle. In accordance with embodiments of the present disclosure, the cut-out 124 of the buffer tower 122 may be used in any automatic or semi-automatic rifle.

Figures 1, 2:
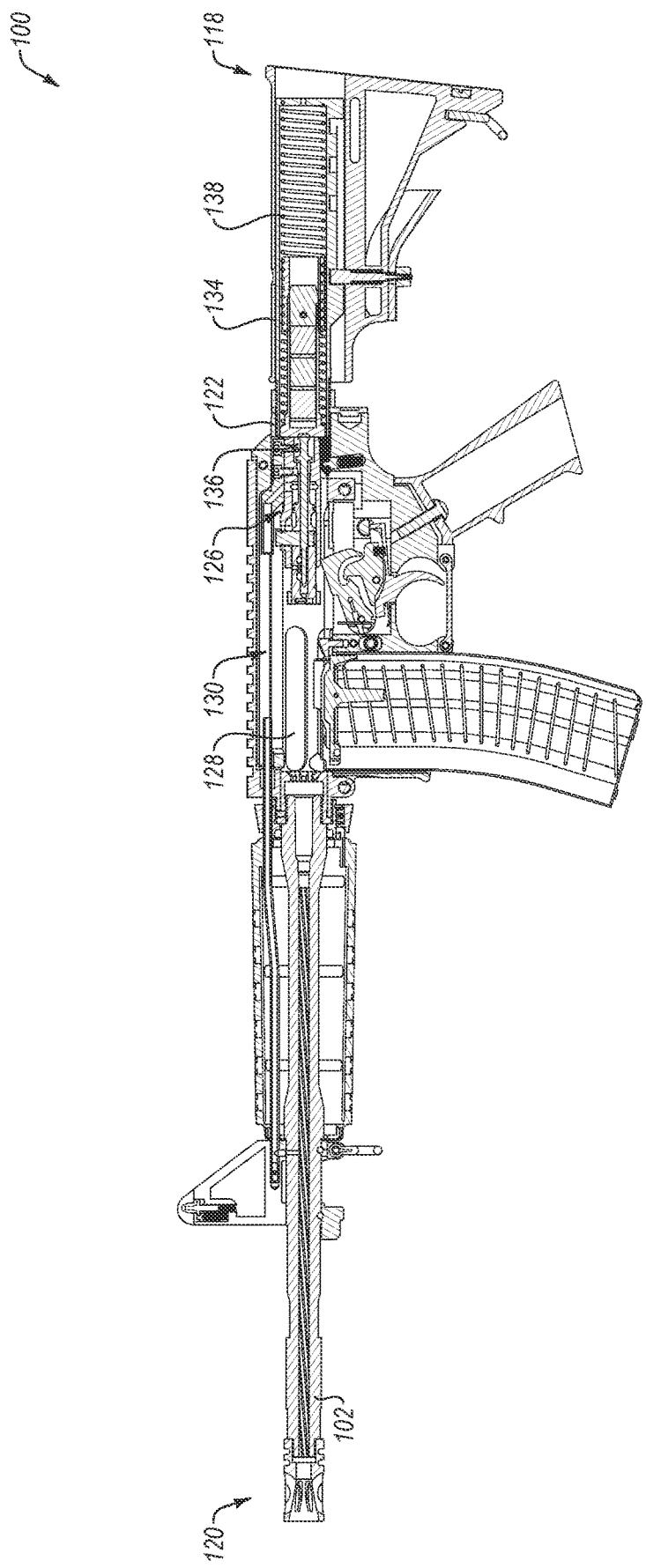
Figures 1, 2:
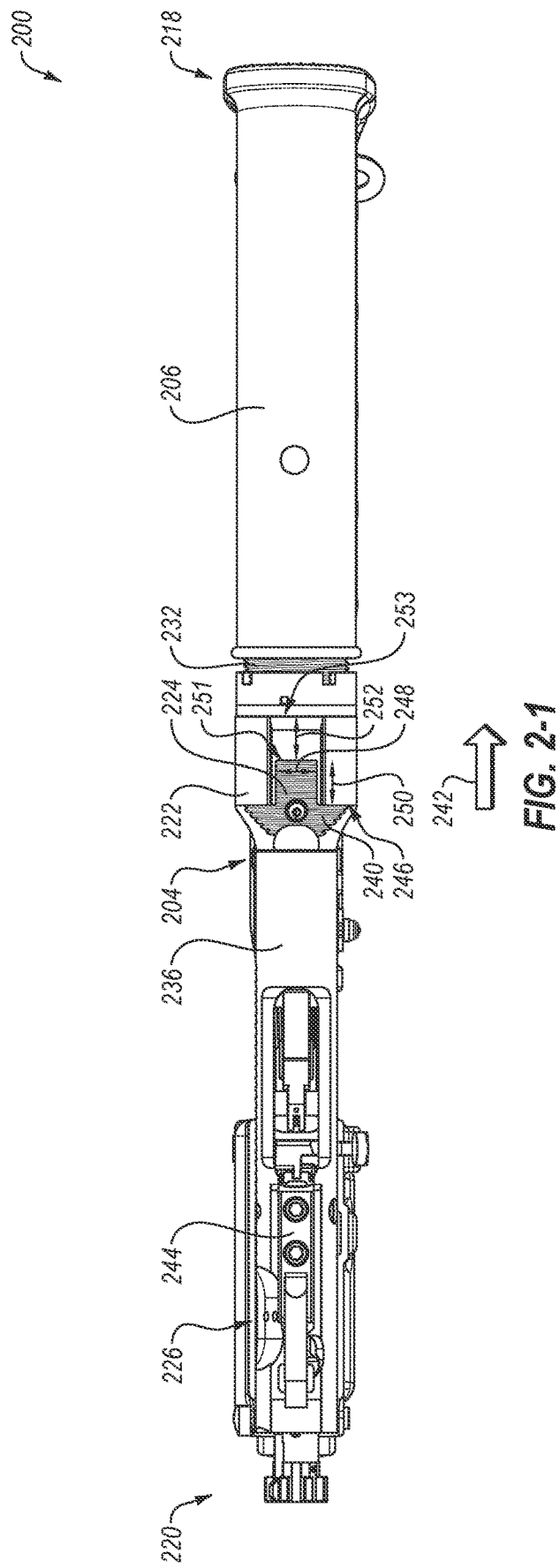
Figure 2:
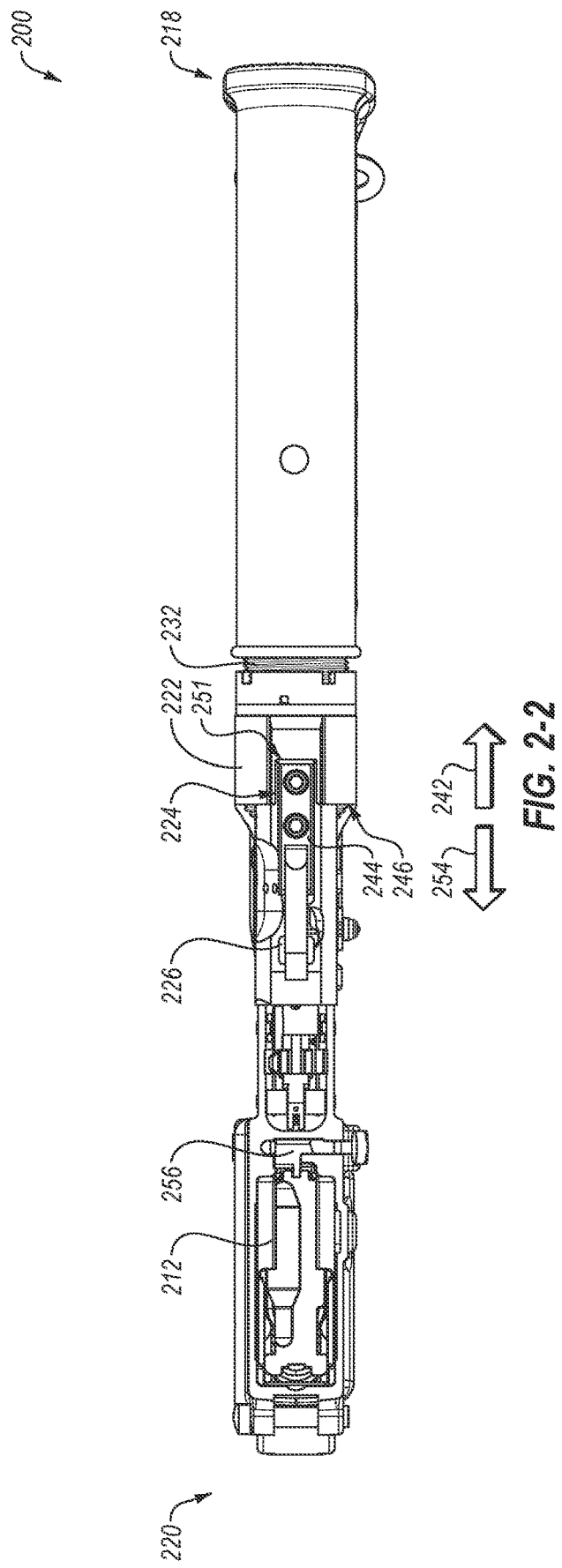

FIG. 1-2 is a cross-sectional view of the rifle 100 of FIG. 1-1. As may be seen, a bolt carrier group 126 is located in a chamber 128 of a body 130 of the rifle 100. The bolt carrier group 126 may be movable along the lower receiver 104 parallel to a longitudinal axis (or along the longitudinal axis) of the barrel 102. Put another way, during actuation of the rifle 100, the bolt carrier group 126 travels parallel to or along the longitudinal axis of the barrel 102. A buffer tube 132 is threaded into the buffer tower 134. A bolt carrier 136 may be connected to the bolt carrier group 126 and be inserted into the buffer tube 132. A buffer spring 138 provides a biasing force against the bolt carrier 136 to push the bolt carrier 136 toward the front end 120 of the rifle 100. During the firing action, the bolt carrier group 126 and the bolt carrier 136 may be pushed backward toward the rear end 118 of the rifle 100, with the bolt carrier 136 travelling into the buffer tube 132. The buffer spring 138 may resist the rearward movement of the bolt carrier group 126. bolt carrier group FIG. 2-1 is a top-down view of a portion of a rifle 200, according to at least one embodiment of the present disclosure. As may be seen, portions of the rifle 200 (including the barrel, handguard, and upper receiver) have been omitted for clarity and ease of explanation and review. The rifle includes a bolt carrier group 226 connected to a bolt carrier 236. The bolt carrier 236 extends into a buffer tube 232. The buffer tube 232 may extend into a stock 106. A lower receiver 204 includes a buffer tower 222. The buffer tower 222 extends upwards from the lower receiver 204. The buffer tower 222 has a cylindrical shape. As may be seen, the buffer tower 222 has internal threads 240. The buffer tube 232 has external threads complementary to the internal threads 240 of the buffer tower 222, and the buffer tube 232 may be threaded into the buffer tower 222.

The buffer tower 222 includes a cut-out 224. The cut-out 224 may be located on an upper surface of the buffer tower 222. In some embodiments, the internal threads 240 may extend into the buffer tower 222 through or across the cut-out 224. In the embodiment shown in FIG. 2-1, the bolt carrier group 226 is located in a frontward position or is located toward a front end 220 of the rifle 200. After a round is discharged, a portion of the discharge energy may push the bolt carrier group 226 and the bolt carrier 236 in a rearward direction 242, or toward a rear end 218 of the rifle 200. This may cause the bolt carrier 236 to be inserted further into buffer tube 232.

The bolt carrier group 226 includes a gas key 244. The gas key 244 may extend in the rearward direction 242. bolt carrier group. In accordance with embodiments of the present disclosure, the buffer tower includes a cut-out 224, or a notch in the buffer tower 222. The cut-out 224 may be located at an upper surface of the buffer tower or oriented with the gas key 244. By orienting the cut-out 224 with the gas key 244, bolt travel length, or the length that the bolt carrier group 226 may move in the rearward direction 242, may be extended.

In some embodiments, the length that the bolt carrier group 226 may move in the rearward direction 242 may be determined by a buffer tube length of the buffer tube 232 and/or a buffer length of the buffer inserted into the buffer tube 232. The extension length of the bolt carrier group 226 may be determined by sizing the buffer tube 232 and/or the buffer to accommodate the extra length of the cut-out 224. In some embodiments, a standard-length buffer tube 232 may accommodate the extra length of the cut-out 224 by reducing the amount that the buffer tube 232 is threaded into the buffer tower 222. As may be seen, the cut-out 224 is open toward the front end 220 of lower receiver 204 and/or the rifle 200. Put another way, an open end of the cut-out 224 may face the front end 220 of the rifle.

The cut-out 224 has a cut-out width 248. In some embodiments, the cut-out width 248 may be in a range having an upper value, a lower value, or upper and lower values including any of 10 mm, 11 mm, 12 mm, 13 mm, 14 mm, 15 mm, or any value therebetween. For example, the cut-out width 248 may be greater than 10 mm. In another example, the cut-out width 248 may be less than 15 mm. In yet other examples, the cut-out width 248 may be any value in a range between 10 mm and 15 mm. In some embodiments, it may be critical that the cut-out width 248 is equal to or greater than a width of the gas key 244 to allow the bolt to travel into the cut-out 224.

The cut-out 224 has a cut-out length 250, which may be the length between the front surface 246 and a front surface 251 of the cut-out 250. The front surface 251 may be located at the rearmost portion of the cut-out 222, or toward the rear end 218 of the rifle 200. When the bolt carrier group 226 moves in the rearward direction 242, the bolt carrier group 226 may travel until the buffer contacts the end of the buffer tube 232. In some embodiments, the cut-out length 250 may be in a range having an upper value, a lower value, or upper and lower values including any of 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 20 mm, or any value therebetween. For example, the cut-out length 250 may be greater than 1 mm. In another example, the cut-out length 250 may be less than 20 mm. In yet other examples, the cut-out length 250 may be any value in a range between 1 mm and 20 mm. In some embodiments, it may be critical that the cut-out length 250 is greater than 10 mm to reduce the felt recoil and increase the cycle time of the bolt carrier group 226, thereby increasing the reliability the magazine feeding rounds into the chamber. In some embodiments, the cut-out length may be limited by a position of a front of the bolt carrier and the hammer of the trigger.

The buffer tower 222 includes a buffer tower thickness 252. The buffer tower thickness 252 may be the distance between the front surface 251 and a rear end 253 of the buffer tower 222. buffer tower thickness 252. In some embodiments, the buffer tower thickness 252 may be in a range having an upper value, a lower value, or upper and lower values including any of 10 mm, 11 mm, 12 mm, 13 mm, 14 mm, 15 mm, 20 mm, or any value therebetween. For example, the buffer tower thickness 252 may be greater than 10 mm. In another example, the buffer tower thickness 252 may be less than 20 mm. In yet other examples, the buffer tower thickness 252 may be any value in a range between 10 mm and 20 mm. In some embodiments, it may be critical that the buffer tower thickness 252 is greater than 10 mm to provide sufficient strength to withstand the impact of the gas key 244 during the bolt action.

The buffer tower has a total length from the front surface 246 to the rear end 253 of the buffer tower 222. In some embodiments, the total length of the buffer tower may be the sum of the cut-out length 250 and the buffer tower thickness 252. In some embodiments, the total length may be in a range having an upper value, a lower value, or upper and lower values including any of 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 30 mm, 35 mm, 40 mm, or any value therebetween. For example, the total length may be greater than 11 mm. In another example, the total length may be less than 40 mm. In yet other examples, the total length may be any value in a range between 11 mm and 40 mm. In some embodiments, it may be critical that the total length is greater than 20 mm to extend the travel of the bolt carrier group 226 and bolt carrier group allow sufficient material in the buffer tower 222 to support the buffer tube 232 and the loads placed on the buffer tower 222.

In FIG. 2-2, the bolt carrier group 226 has moved in the rearward direction 242 until the buffer has engaged the rear of the buffer tube 251, thereby arrested the motion of the bolt carrier group 226 in the rearward direction 242. As may be seen, the gas key 244 has entered the cut-out 224 of the buffer tower 222. For example, the gas key 244 entered the cut-out 224 by passing past the front surface 244. After contact of the buffer with the rear end of the buffer tube 232, the buffer spring in the buffer tube 232 may push the bolt carrier group in the forward direction 254 (e.g., toward the front end 220 of the rifle 200).

As discussed herein and seen in a comparison between FIG. 2-1 and FIG. 2-2, the travel of the gas key 244 into the cut-out 224 of the buffer tower 222 may extend the bolt travel of the bolt carrier group 226. Travel of the bolt carrier group 226 may help with the expansion and release of gasses caused by ignition of the charge in the round. As the gasses are released, the speed of the bolt carrier group 226 may be reduced (at least in part due to the buffer spring providing an opposing force) as the bolt carrier group 226 travels in the rearward direction. bolt carrier group. In this manner, the speed of the bolt carrier group 226 may be further reduced, thereby reducing the force applied when the bolt carrier group buffer engages the buffer tube 232. This may reduce the recoil felt by the user, which may result in decreased risk of discomfort and/or injury by the user.

In some embodiments, additional gas release may help increase the effectiveness of suppressors (e.g., "silencers") used in conjunction with the rifle 200. A suppressor may cause an increase in bolt velocity as the bolt travels in the rearward direction. Because of the extra length of travel provided by the cut-out 224, this increased velocity may be further reduced by the time that the buffer engages the rear end of the buffer tube 232.

As discussed herein, the cycling of the bolt carrier group 226 occurs over a period of time. By extending the travel length of the bolt carrier group 226, the cycle period may be increased. In some embodiments, the length of travel of the bolt carrier group 226 past the magazine 212 may be extended by the cut-out length 250. In some embodiments, this may provide a bolt travel past the magazine increase percentage. For example, conventionally the travel past the magazine may be approximately 17.7 mm. If the cut-out length 250 is 13 mm, then the bolt travel past the magazine increase percentage is 73% (e.g., 13/(13+17.7)). This may result in a commensurate increase in the travel time past the magazine 212. An increase in the travel time past the magazine 212 may provide the magazine 212 with additional time to move a round up and into the travel path of the bolt. This may help to improve the reliability of the feeding of rounds from the magazine 212. In some embodiments, based on the increased travel distance past the magazine 212, the speed of the bolt carrier group 226 as it reaches the magazine 212 on the return stroke may be increased. This may increase the force with which the bolt carrier group 226 may contact the round in the bolt carrier group magazine and strip it from the magazine thereby pushing it towards and into the chamber, thereby improving the reliability of stripping the round from the magazine.

In some embodiments, the increased travel by the bolt carrier group 226 may help to increase the distance that the bolt carrier group 226 may travel past the bolt catch 256. After discharge of the final round in the magazine 212, the magazine may engage and push up on the bolt catch 256. When fully extended, the bolt catch 256 may prevent the bolt carrier group 226 from moving further forward in the frontward direction 254. This may provide a post bolt catch travel distance increase. For example, conventionally, the post bolt catch travel may be approximately 5.8 mm. If the cut-out length 250 is 13 mm, then the bolt catch travel percentage is 223% (e.g., 13/(13+5.8)). This may result in a commensurate increase in the travel time past the bolt catch 256. An increase in the travel time past the bolt catch 256 may provide the magazine 212 and the bolt catch 256 additional time to move into place to prevent forward motion of the bolt carrier group 226. This may help to improve the reliability of the bolt catch 256 in moving upward to engage the bolt carrier group 226.

Figures 1, 3:
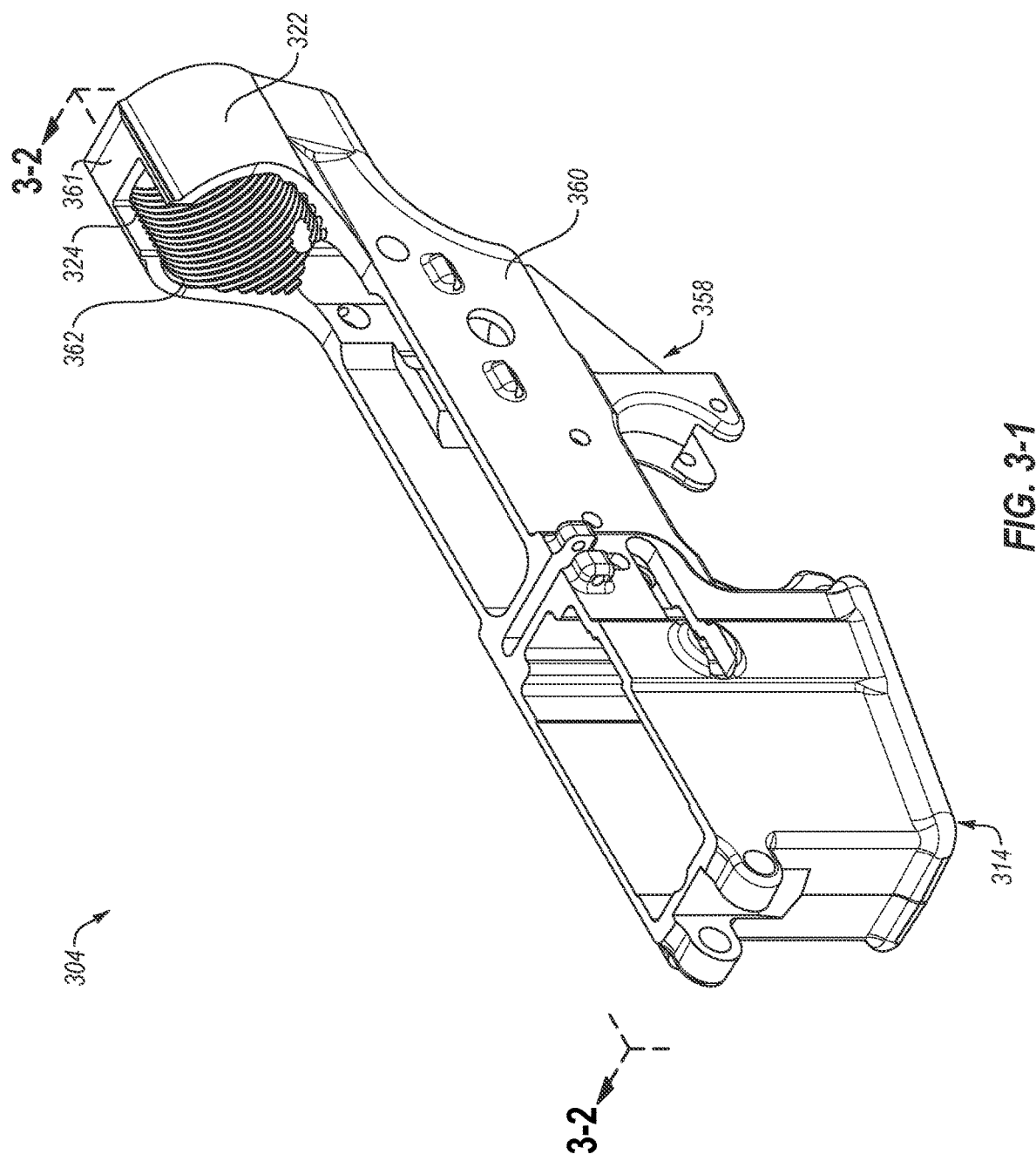
Figures 2, 3:
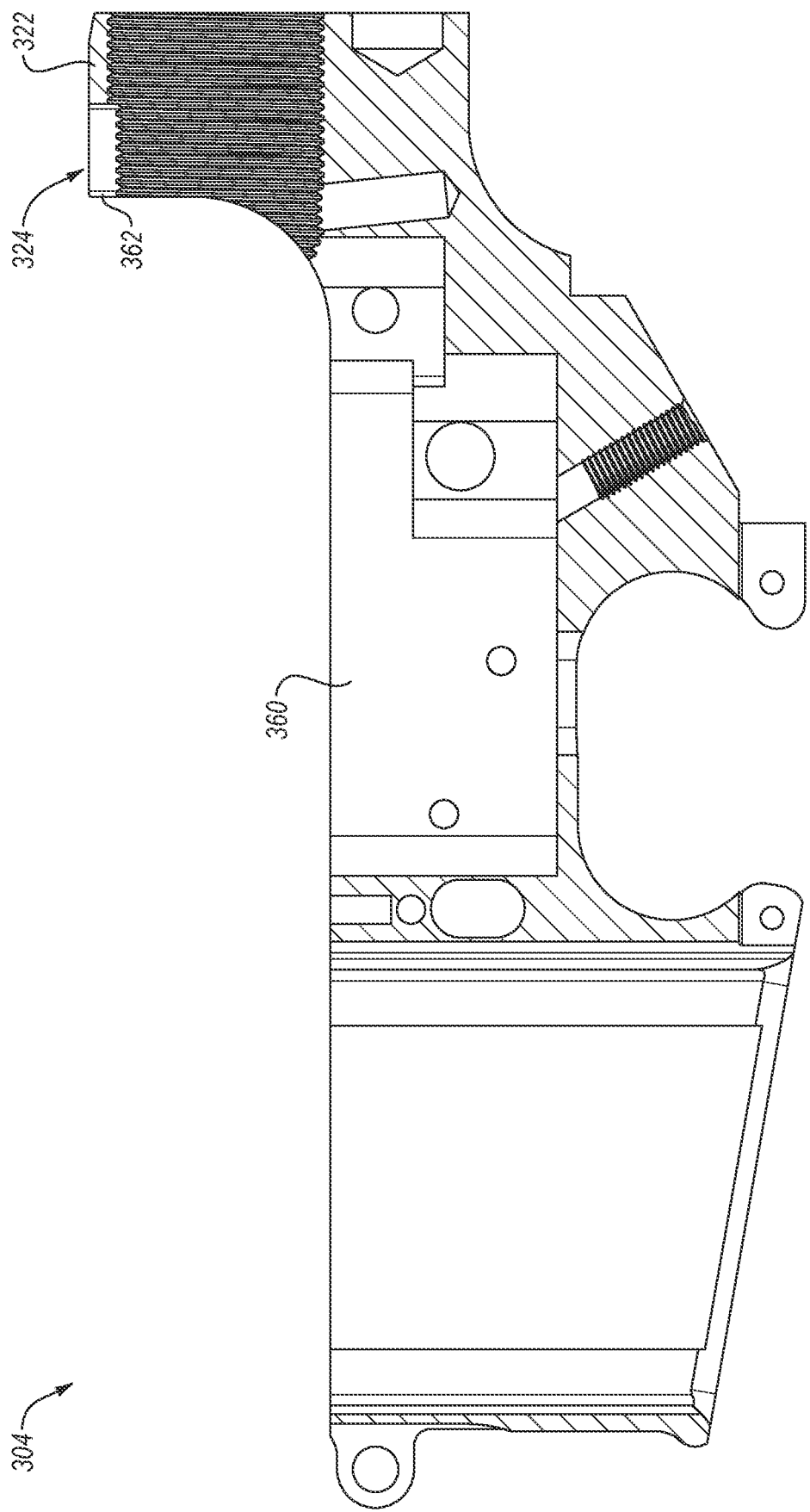

FIG. 3-1 is a perspective view of a representation of a lower receiver 304, according to at least one embodiment of the present disclosure. The lower receiver 304 includes a magazine well 314 into which a magazine may be connected. The lower receiver 304 may further include a pistol grip connection 358, to which the pistol grip may be connected. A buffer tower 322 may extend up from a body 360 of the lower receiver 304.

The buffer tower 322 includes a cut-out 324 on an upper surface 361 of the buffer tower 322. The cut-out may extend through an entirety of a tower wall 362 of the buffer tower 322. This may allow the bolt carrier group and the gas key to pass into the cut-out 324, thereby extending the travel distance of the bolt carrier group during bolt action. As may be seen, an inner surface of the tower wall 362 may be threaded. The threaded inner surface of the tower wall 362 may extend through the section of the tower wall 362 including the cut-out 324. In some embodiments, the threaded inner surface of the tower wall 362 may not extend through the section of the tower wall 362 that includes the cut-out 324. A buffer tube may be threaded into the inner surface of the tower wall 362.

FIG. 3-2 is a cross-sectional view of the lower receiver 304 of FIG. 3-1. As may be seen, the cut-out 324 located on an upper end of the buffer tower 322 may extend through an entirety of the tower wall 362. In some embodiments, the lower receiver 304 may be formed from any material, such as aluminum, polymers, steel, or any other material. The lower receiver may then be milled, stamped, or otherwise processed into the shape of the lower receiver. In some embodiments, the lower receiver 304 may be formed using additive manufacturing techniques. In some embodiments, the lower receiver 304 may be formed using a combination of both subtractive and additive manufacturing techniques. In some embodiments, the buffer tower 322 may be integrally formed with the body 360 of the lower receiver 304. In some embodiments, the buffer tower 322 may be separately formed and later connected to the lower receiver 304.

Figure 4:
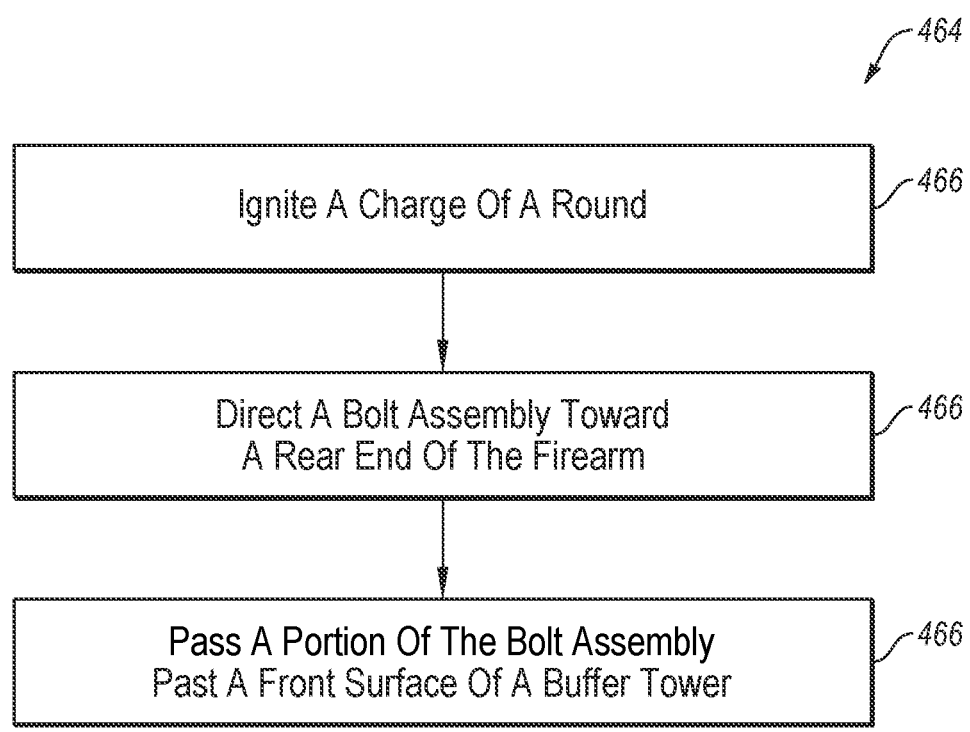
FIG. 4 is a flowchart of a method for discharging a firearm, according to at least one embodiment of the present disclosure.

FIG. 4 is a flowchart of a method 464 for discharging a firearm, according to at least one embodiment of the present disclosure. To discharge the firearm, a charge of the round is ignited using a firing pin at 466. Igniting the charge may release gasses, and at least a portion of the gasses may be used to direct a bolt carrier group toward a rear end of the firearm at 468. As the bolt carrier group moves toward the rear end of the firearm, a portion of the bolt carrier group, including a gas key, may pass past a front surface of a buffer tower at 470. The gas key may enter a cut-out of the buffer tower. In some embodiments, the rearward motion of the gas key may be arrested by a contact of the contact of the buffer with an end of the buffer tube. In some embodiments, as discussed herein, passing the gas key past the front surface of the cut-out may include passing the gas key at least 10 mm past the front surface of the cut-out.

As discussed herein, passing the gas key past the front surface of the cut-out of the buffer tower may increase the cycle time of the bolt action of the rifle. This may improve the reliability of the feeding mechanism of the magazine and/or the reliability of the bolt catch mechanism.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A rifle, comprising:
   a lower receiver;
   a barrel connected to the lower receiver, the barrel including a longitudinal axis;
   a bolt carrier group configured to strip rounds from a magazine and feed rounds into a chamber, the bolt carrier group traveling parallel to the longitudinal axis of the barrel; and
   a buffer tower connected to the lower receiver, wherein the buffer tower includes a cut-out on an upper end thereof, the cut-out extending a travel length of the bolt carrier group during actuation of the bolt carrier group.

2. The rifle of claim 1, wherein the cut-out has a cut-out length of greater than 10 mm.

3. The rifle of claim 1, wherein the cut-out has a cut-out width of approximately 12 mm.

4. The rifle of claim 1, wherein the cut-out has a cut-out length of a distance between a hammer and a front of the bolt carrier group.

5. The rifle of claim 1, wherein the buffer tower includes a buffer tower length, the buffer length being greater than 20 mm.

6. The rifle of claim 1, the buffer tower being integrally formed with the lower receiver.

7. The rifle of claim 1, the lower receiver and the buffer tower being formed by additive manufacturing.

8. The rifle of claim 1, wherein the cut-out is open toward a front end of the rifle.

9. A lower receiver for a rifle, comprising:
   a connection to a pistol grip;
   a magazine well; and
   a buffer tower configured to receive a buffer tube, the buffer tower including a cut-out on an upper surface thereof, the cut-out extending through a wall of the buffer tower.

10. The lower receiver of claim 9, wherein a cut-out length of the cut-out is greater than 5 mm.

11. The lower receiver of claim 9, wherein a cut-out width of the cut-out is greater than 10 mm.

12. The lower receiver of claim 9, wherein the cut-out has a cut-out length of a distance between a hammer and a front of a bolt carrier group.

13. The lower receiver of claim 9, wherein the cut-out is located at an upper portion of the buffer tower.

14. The lower receiver of claim 9, wherein the cut-out is open toward a front of the lower receiver.

15. The lower receiver of claim 9, wherein a buffer tower length is greater than 20 mm.

16. The lower receiver of claim 9, wherein an inner surface of the buffer tower is threaded through the cut-out.

17. A method for discharging a firearm, comprising:
    igniting a charge of a round with a firing pin;
    using a portion of expanding gas from ignition of the charge, directing a bolt carrier group toward a rear end of the firearm; and
    passing a portion of the bolt carrier group past a front surface of a buffer tower of the firearm and into a cut-out of the buffer tower.

18. The method of claim 17, wherein passing the portion of the bolt carrier group past the front surface includes passing the portion of the bolt carrier group a distance between a hammer and a front of the bolt carrier group.

19. The method of claim 17, wherein passing the portion of the bolt carrier group includes passing the portion of the bolt carrier group at least 10 mm past the front surface.

20. The method of claim 17, wherein passing the portion of the bolt carrier group increases a cycle time for the bolt carrier group.

* * * * *